Patented July 22, 1941

2,250,345

UNITED STATES PATENT OFFICE 2,250,345

DEODORIZING METHOD

William M. Allison, New York, N. Y., assignor to Oakite Products, Inc., a corporation of New York No Drawing. Application May 27, 1937, Serial No. 145,166

7 Claims. (Cl. 21—55)

This invention relates to the prevention of odors and the deodorization of waters employed in pasteurizing equipment. It concerns principally the utilization of stable metallo-organic compounds having germicidal power in combination with salts having reducing action and also those having detergent properties.

At present it is the general practice to subject various beverages, especially beer, and food products to pasteurization by immersing the bottles or other containers in water held at a pasteurizing temperature for a period which is long enough to kill or inhibit the micro-organisms in the products in order to prevent spoilage of the food products. In the process of this pasteurization a considerable amount of organic material is introduced into the pasteurizing water bath by the accidental spillage on containers during their filling and the occasional breaking of a container. As this organic matter will support bacterial growth when the water is allowed to cool for a short period of time, the products of bacterial decomposition will foul the solutions and the atmosphere in the vicinity of the pasteurizer.

In addition to the products of bacterial decomposition, the action of the heat on the organic materials introduced into the pasteurizing water in some cases produces materials which have unpleasant odors. These materials may be produced either by the decomposition or polymerization of the organic materials which may be in the pasteurizing water. While the odors of these materials are not characteristic of the mercaptan odors of bacterial decomposition, they are persistent and unpleasant.

In many cases when pasteurizer water is treated to prevent odors, it is necessary to add materials which will prevent oxidation of the equipment and also to prevent precipitates which will accumulate on the containers passing through the water. This precipitate is caused by the inorganic salts present in most natural waters which will precipitate when the water is heated or there is considerable evaporation of the water.

It has now been found that metallo-organic compounds having germicidal action are highly suitable for the prevention of odors caused by bacterial decomposition. The germicidal metallo-organic compounds, which are preferably employed in accordance with this invention, are those which are composed of a metal or metals having a valence above one and wherein at least one of the valence bonds is attached to a nitrogen or carbon atom of an organic radical. A representative formula for such a compound is $R_n-Me_p-X_m$, in which Me may be any metal or metals having a valence above one and which will form metallo-organic compounds having germicidal properties; R may be any organic radical wherein any or none of the hydrogen atoms attached to the carbon atoms may be substituted by elements or groupings, R having the metal or metals Me attached to a carbon or nitrogen atom; X is an inorganic or organic radical or grouping, the latter of which is linked to the metal or metals Me by means of oxygen, nitrogen, sulphur, carbon or phosphorus, except in cases where there is a double metal linkage; and $n$, $m$ and $p$ represent integers.

Examples of metallo-organic compounds having germicidal action and suitable for the prevention of odors caused by bacterial decomposition are phenyl mercuric acetate, $C_6H_5HgC_2H_3O_2$; diphenyl mercury, $(C_6H_5)_2Hg$; phenyl mercuric sodium thioglycollate, $C_6H_5HgSCH_2COONa$; phenyl arsenious disodium thioglycollate, $C_6H_5As(SCH_2COONa)_2$; amino phenyl copper acetate, $NH_2C_6H_4CuC_2H_3O_2$; arsenobenzene $As_2(C_6H_5)_2$; and its derivatives, phenyl mercuric nicotinate, $C_6H_5HgOOCHC_5H_4$; methyl oleamide ethyl phenyl mercuric sulfonate,

$$C_6H_5HgO_3SC_2H_4NCH_3OC_{17}H_{33}$$

and the metallo-organic compounds having the metal linked to the nitrogen atom, such as mercury diacetamide, $Hg(HNC_2H_3O)_2$; and those with the imido linkage, such as phenyl mercuric guanidine, $C_6H_5HgNC(NH_2)_2$. It is also possible to use that type of compound in which two or more similar or dissimilar metal atoms are attached to the same organic radical as represented by amino phenyl 2-6 mercuric hydroxide 4 sodium arsenate, $NH_2C_6H_2(HgOH)_2AsOONa$.

While in most cases it will be found advisable to use a single metallo-organic germicidal compound for preventing odors from bacterial action in pasteurizer water, a combination of these compounds which are compatible with each other would be desirable in some cases.

For preventing odors which are in some cases caused by polymerization or decomposition of the organic materials in the pasteurizer waters, it has been found that a material having decided reducing power is highly efficient. It has been found that, in most cases, any material having an oxidizing action accentuates the odor rather than dissipates it. Among the materials best suited to meet this requirement for reducing action are sodium thiosulfate, $Na_2S_2O_3$; sodium hypophosphite, $Na_3PO_2$; sodium phosphite, $Na_3PO_3$; sodium sulfite, $Na_2SO_3$; sodium metabisulfite, $Na_2S_2O_5$; sodium acid sulfite, $NaHSO_3$; and hydrazine, $NH_2.NH_2$.

Examples of the materials to be used for preventing the precipitation of the salts contained in the water from collecting on the containers passing through the water are the alkaline materials sodium metasilicate, trisodium phosphate, tetra sodium pyrophosphate, sodium metaphosphate, and other materials of this type.

In the treatment of pasteurizer waters for elimination of odors, the type of treatment will depend upon existing conditions. If there is no odor caused by polymerization or decomposition and no sedimentation of inorganic salts in the water, the treatment for preventing odors would consist in the application of one or more of the metallo-organic germicidal materials to prevent odors caused by bacterial action preferably in admixture with a filler consisting of a neutral material or an alkaline material but not necessarily. A representative formula for such a material would be

|  | Per cent |
|---|---|
| Methyl oleamide ethyl phenyl mercuric sulfonate | 2 |
| Sodium sulfate | 98 |

If there is an odor caused by polymerization or decomposition of the organic materials introduced into the pasteurizer, such as is usually found in beer pasteurizers, and there is no precipitation of the inorganic salts which collect on the containers; a representative formula for this type material would be

|  | Per cent |
|---|---|
| Phenyl mercuric sodium thioglycollate | 2 |
| Sodium thiosulfate | 98 |

In those cases where there is a three-fold duty to perform with this material, a representative formula for preventing odors caused by bacterial action, preventing odors caused by polymerization or decomposition, and preventing precipitates from clinging to the containers, would be

|  | Per cent |
|---|---|
| Phenyl mercuric acetate | 2 |
| Sodium thiosulfate | 49 |
| Trisodium phosphate | 49 |

In those cases where there are the conditions demanding prevention of odors caused by bacterial action and prevention of precipitate on containers, a representative material for this would be

|  | Per cent |
|---|---|
| Amino phenyl 2-6 mercuric hydroxide 4 sodium arsenate | 2 |
| Tetrasodium pyrophosphate | 98 |

These materials may be applied intermittently to the pasteurizer waters in the dry form or in solution, or they may be applied continuously by mechanical means.

The concentration of the metallo-organic materials, the neutral materials, the reducing agents and the alkaline materials in any preparation may be varied within wide limits, and the combinations of the materials may be varied likewise. It has been found that by maintaining a concentration of approximately .025% of the typical formulas given above, effective control of the several different conditions for which they are designed is obtained. However, the concentration of the solution may be varied within wide limits according to the requirements in particular cases to the type of material applied; namely, the types of materials in the pasteurizer water and their concentration.

While I have described herein some embodiments of my invention, I wish it to be understood that I do not intend to limit myself thereby except within the scope of the appended claims.

I claim:

1. A method of preventing and destroying odors in waters employed in pasteurizing equipment which comprises incorporating with said waters a germicidal metallo-organic compound containing an organic radical and at least one metal having a valence of at least two, at least one of the valence bonds of such metal being attached to an atom of the group consisting of nitrogen and carbon of said organic radical.

2. A method of preventing and destroying odors in waters employed in pasteurizing equipment which comprises incorporating with said waters a germicidal metallo-organic compound having the general formula $R_nMe_pX_m$, wherein Me is at least one metal having a valence of at least two, R is an organic radical having said Me attached to an atom selected from the group consisting of nitrogen and carbon, X is at least one substituent radical, and $n$, $p$, and $m$ represent integers.

3. The method of preventing and destroying odors in waters employed in pasteurizing equipment comprising incorporating with said waters a metallo-organic compound having the general formula $R_nHgX_m$, wherein R is an organic radical having the Hg atom attached to an atom selected from the group consisting of nitrogen and carbon, X is at least one substituent radical, and $n$ and $m$ represent integers.

4. The method of preventing and destroying odors in water employed in pasteurizing equipment comprising incorporating with said waters a metallo-organic compound having the general formula $R_nAsX_m$, wherein R is an organic radical having the As atom attached to an atom selected from the group consisting of nitrogen and carbon, X is at least one substituent radical, and X may have attached to it another arsenic atom to which the As is attached and $n$ and $m$ represent integers.

5. The method of preventing and destroying odors in waters employed in pasteurizing equipment which comprises incorporating phenyl mercuric acetate with said waters.

6. The method of preventing and destroying odors in waters employed in pasteurizing equipment which comprises incorporating diphenyl mercury with said waters.

7. The method of preventing and destroying odors in waters employed in pasteurizing equipment which comprises incorporating phenyl arsenious disodium thioglycollate with said waters.

WILLIAM M. ALLISON.